Nov. 14, 1933.   P. LEVI   1,935,035
TIRE CHAIN
Filed June 4, 1929
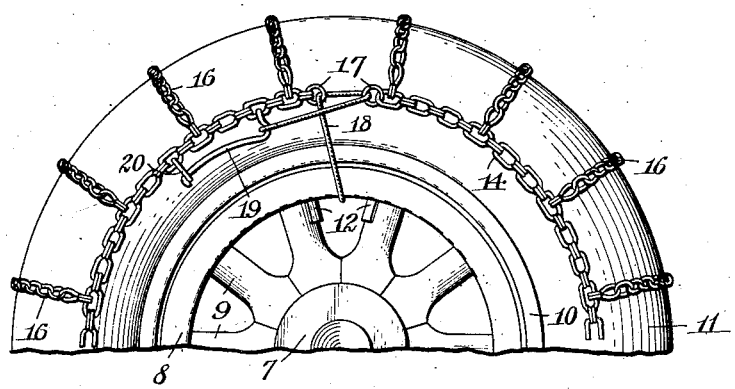
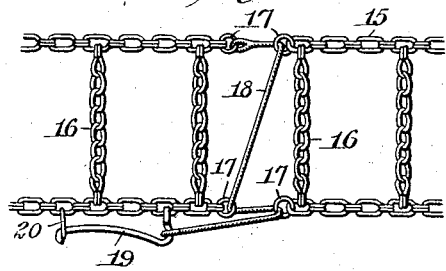
Paul Levi, Inventor.
By Emil Kuhbart
Attorney.
Witness:
J. J. Oberst, Patented Nov. 14, 1933

1,935,035

UNITED STATES PATENT OFFICE 1,935,035

TIRE CHAIN

Paul Levi, Gowanda, N. Y.

Application June 4, 1929. Serial No. 368,382

2 Claims. (Cl. 152—14)

My invention relates to improvements in tire chains of the type generally referred to as non-skid chains or devices for tires.

The primary object of my invention is to provide an improved tire chain which can be easily applied to and removed from an automobile wheel, and which is simple in construction and so constructed that it cannot become accidentally loosened from the wheel.

Another object of my invention is to provide a non-skid chain for tires embodying the general principle of the standard non-skid chain comprising two side chains and connecting cross or tread chains, so improved in arrangement and construction that it can be easily applied to a tire under all conditions, and be as readily removed therefrom, and when applied will assure maximum traction and firm contact of the cross or tread chains with the tire.

A further object of my invention is to provide a non-skid chain capable of being more readily applied to or removed from a tire than non-skid chains now in use, regardless of the condition of the road surface, without jacking up the automobile.

A further object of my invention is to provide a non-skid chain for tires having side members and tread chains connecting said side members, and which is so attached to the tire of an automobile that, when the tread chains or any of them become worn through, it will be impossible for the non-skid chain to become detached from the automobile and lost.

A further object of my invention is the provision of a non-skid chain for tires, which will be highly effective in soft ground, snow, or mud, and will, in passing through such soft substances, become tightened on the tire and assure increased traction; in contra-distinction to the ordinary non-skid chain, which in passing through such soft substances, will creep along the tire and consequently lose traction.

A further object of my invention is the provision of an improved tire chain or non-skid device in which two side chains or members and cross or tread chains or members are employed and in which provision is made at one side of the tire to secure both side chains or members in position at opposite sides of the tire.

A further object of my invention is the production of a tire chain which will prevent the noise frequently arising in ordinary tire chains by reason of the tread chain being loose and striking parts of the automobile.

A still further object of my invention is the provision of a tire chain of the kind mentioned having two side chains adapted to lie at opposide sides of a tire, and cross or tread chains connecting said two side chains; the side chains being of different lengths or circumference so that one chain can be easily placed over the tire in the direction of its axis to assume a position at one side thereof and be thence tightened by drawing upon the chain at one point so as to tighten the same; or, by drawing said chain toward the axis of the wheel and transversely around the felloe thereof, and suitably tightening the same, preferably at the opposite side of the wheel.

With the above and other objects in view to appear hereinafter, my invention consists in the novel features of construction, and in the novel arrangement and combination of parts to be hereinafter described and more particularly pointed out in the subjoined claims.

In the drawing:—

Fig. 1 is a side elevation of approximately one-half of an automobile wheel having wooden spokes and a wooden felloe, and having my improved non-skid chain applied to the tire thereof.

Fig. 2 is a fragmentary plan view of my improved chain.

In the drawing, portions of two different types of automobile wheels are shown, in which 7 designates the hub of the wheel, 8 the wheel felloe, 9 the spokes connecting the hub of the wheel with the felloe thereof, 10 the tire rim, and 11 the tire.

In Fig. 1, the wheel is shown as having wooden spokes and a wooden felloe, and on the opposing sides of adjacent spokes, wear or contact plates 12 are secured which extend from the felloe inwardly a short distance, for a purpose to appear hereinafter. In Figs. 3 and 4 the spokes are of wire, and the wheel felloe of metal, and fastened into the wheel felloe between two adjacent spokes are spaced wear or stop pins 13.

My improved non-skid device or tire chain comprises an outer side member or chain 14, an inner side member or chain 15, and cross or tread members or chains 16 connecting the side members or chains at regular intervals. In this respect the device or tire-chain need not differ from the conventional non-skid device or tire-chain now in common use. However, under the principle involved in my invention, at least one of the side chains is made circularly expansible. These side chains may be made endless, or may be rendered substantially endless by connecting the ends of each chain together in a circumferentially contractible and expansible manner; and whether or not they are made endless, are applied to the wheel by passing them transversely over the tread of the wheel, preferably from the outer side thereof.

In the embodiment of my invention shown the circular side chains 14 and 15 are formed of definite lengths of chains connected in parallel relation by cross or other suitable tread chains 16, and the ends of the side chains are connected together by a flexible connector in the form of a wire or other suitable material so that these side chains may be referred to as circumferentially contractible or expansible chain rings. The ends of these side chains or chain rings may be provided with ring loops 17, and to the loop at one end of the inner side chain, one end of a wire cable 18, previously referred to as a flexible connector, is secured; said cable being passed through the loop of the same chain at the opposite end thereof and being thence drawn through the wheel between adjacent spokes thereof to the outer side of the wheel where it is passed through the loop at the end of the outer side chain corresponding to that of the inner side chain to which the said terminal of the wire cable is secured; said wire being thence directed through the loop at the opposite end of the outer side chain and having its other terminal connected to a cam lever 19 which is swingably secured to one of the links of said outer side chain and adapted to strain or draw the wire cable taut, thus causing the ends of each of the two side chains to be drawn toward each other so as to diminish the circumferences or diameters of these side chains. The cam lever is retained in straining position by the keeper link 20 looped through one of the links of said outer side chain and maintains said wire cable and the side chain under strain.

The connection of the wire cable or flexible member 18 to the cam lever 19 is in the form of a loop arranged at the outer end of the cable or flexible member capable of moving along the cam lever so that the wire or flexible member may be completely disconnected from the cam lever in order to enable the inner side chain to be passed over the tread of the tire, or to enable the ends of the side chains to be completely disconnected so as to allow the tire chain to be placed in flat or straight-lined condition on the road surface.

A tire chain so constructed may be easily attached to a tire by jacking up the car, or by moving a wheel of a car onto the tire chain as it lies upon the road in flat or straight-lined position. It is commonly known that when on soft roads, considerable difficulty is experienced in jacking up a car, due to the fact that a solid foundation for the jack used for such purpose cannot always be provided. Consequently, when applying my improved tire chain to a tire, under such conditions, the chain can be laid flat or in straight-lined position over the road surface in line with the tire to which it is to be applied, either in front or in rear of the same; after which the automobile can be moved forwardly or backwardly, as required, onto the flat chain. The ends of the chain may then be drawn upwardly onto the tire and the wire cable or other flexible connector 18 having one terminal thereof secured to one end of the inner side chain passed through the loop at the other end of said side chain. This can be accomplished by drawing both ends of said inner side chain outwardly over the tread of the tire so that both ends of said inner side chain are conveniently accessible, although spaced a considerable distance apart; this being permitted owing to the flexible connector being comparatively long. After the flexible connector has made connection between the two terminals of the inner side chain, it may be drawn upon and at the same time the end portions of the inner side chain moved over the tread of the tire so that these end portions will gradually be drawn close together while positioning them at the inner side of the tire. When the flexible connector is drawn taut so as to draw the terminals of the inner side chains closer together, or as much as the length of said inner side chain permits, the flexible connector is allowed to hang down at the inner side of the wheel and may be taken hold of by passing the hand through the space between two adjacent spokes. This flexible connector is then drawn outwardly through said space and passed through the loop at one terminal of the outer side chain, preferably the terminal corresponding to that at which the end of the flexible connector is secured to the inner side chain; thence through the loop at the other terminal of said outer side chain so that upon straining or drawing said flexible connector taut, the ends of the outer side chain will be drawn together, or at least toward each other, after which the loop at the outer end of the flexible connector is passed over the cam lever 19 and tightened by engaging the free end of said cam lever with the retainer loop 20.

It will be apparent, therefore, that without lifting the tire from the road surface the tire chain can be conveniently applied by manipulating the flexible connector entirely from the outer side of the wheel.

If desired, the automobile may be jacked up to lift the tire out of contact with the road surface and the tire chain applied while keeping the ends of the inner side chain in connected condition with the terminals of said inner side chain separated to a considerable extent so that the circumference of said inner side chain, considering that portion of the flexible connector connecting the terminals thereof as part of said side chain, will be greater than the circumference of the tire. The outer tire chain, however, will have its ends disconnected. Under such arrangement, an intermediate portion of the tire chain is placed underneath the wheel lifted from the road surface, and the circumferentially arranged inner side chain passed over the tread of the tire so as to lie completely at the inner side of the tire with the flexible connector hanging downwardly therefrom at the inner side of the wheel. The depending portion of the flexible connector will be accessible through a space between two adjacent spokes of the wheel, and when drawn outwardly through such space, it is passed through the loops 17 at the ends of the outer side chain and connected to the cam lever 19 in the manner hereinbefore referred to.

Under both methods of applying the tire chain to the tire, the ends of the inner side chain are connected with the ends of the outer side chain; and after the side chains are thus connected together, the flexible connector is strained or tightened to circumferentially contract said side chains to substantially the same diameters and to smaller diameters than the tire, the contractible limitation being determined by the cross or tread chains.

It is desirable to have the flexible connection between the ends of the chains passed between the two spokes having the wear or contact plates 12 secured thereto, or in a wire wheel through the space into which the wear or stop pins 13 project from the felloe of the wheel, so that in the event of the chain creeping slightly on the tire, the flexible connector will come in contact with either one or the other of the wear plates or studs, and prevent further creeping action; also marring of the paint on the spokes.

Due to the connection of the two side chains and the cam-lever and its coacting keeper loop serving as a straining and fastening device for the side chains, it will be apparent that the straining and fastening means arranged at one side of the tire serve as the securing means for the side chains positioned at opposite sides of the tire.

By drawing the connector between the two side chains taut, these side chains are tightened to like degrees and the tread chains prevented from coming in contact with the automobile and causing noise; which frequently occurs with tire chains now in use, due to the tread chains being loose and flopping against the mud guard positioned over the tire.

By reason of a single connection being provided at the ends of the chains and both side chains being equally strained, even traction is assured under all traveling conditions; and due to the fact that the flexible connection between the chains is passed through the wheel, limited creeping only of the chain on the tire is permitted, thus increasing the traction of the wheel having the tire chain so applied thereon, especially when traveling upon roads having a soft surface.

When applying tire chains embodying my invention to tires applied to disk wheels, it will be necessary that a transversely-arranged opening be formed in the disk of the wheel for the passage of the flexible connector therethrough; and as disk wheels are not so formed, my invention is adapted only to disk wheels specially constructed with such openings.

It will be apparent from the foregoing that a non-skid device or tire chain constructed in accordance with my invention comprises two side chains or members and cross or tread chains or members connecting said side chains or members in parallelism, said cross or tread chains or members serving as flexible connections between the chains which fix their relation on the tire at opposite sides thereof, and a flexible connection, or straining or securing means, between the two side chains or members which passes through the wheel having the tire applied thereto and which serves to tighten at least one of said side chains.

Having thus described my invention, what I claim is:—

1. A tire chain, comprising two side chains adapted to be positioned in circular form at opposite sides of a tire and tread chains connecting said side chains and adapted to extend over the tread of the tire, each side chain having loops at opposite ends, a flexible element connected to the loop at the end of one side chain and being thence passed through the loop at the other end of said side chain, said flexible connection being adapted to be passed through the wheel to which the tire is applied and being passed through the loop at one end of the other side chain and thence through the loop at the other end of said last-mentioned side chain, and means for placing said flexible connection under strain and so retaining the same.

2. A tire chain, comprising two side chains adapted to be positioned in circular form at opposite sides of a tire and tread chains connecting said side chains and adapted to extend over the tread of the tire, each side chain having loops at opposite ends, a flexible element connected to the loop at the end of one side chain and being thence passed through the loop at the other end of said side chain, said flexible connection being adapted to be passed through the wheel to which the tire is applied and being passed through the loop at one end of the other side chain and thence through the loop at the other end of said last-mentioned side chain, and means swingably connected to said last-mentioned side chain adapted to strain said flexible connection for drawing said side chains taut at opposite sides of the tire and so retaining the same.

PAUL LEVI.